Aug. 28, 1962    C. A. FREIHOFER    3,051,388
METHOD OF MEASURING AND SUMMING TIME FUNCTION DATA
Filed June 7, 1954    2 Sheets-Sheet 1

INVENTOR.
Charles A. Freihofer
BY Howson & Howson
ATTORNEYS

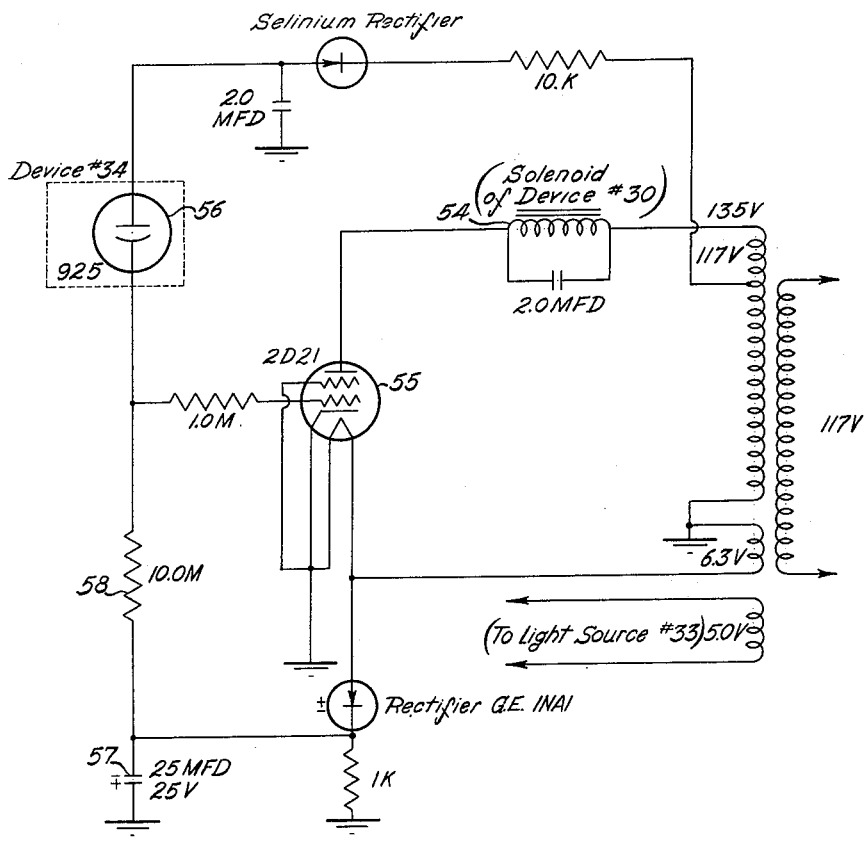

3,051,388
METHOD OF MEASURING AND SUMMING
TIME FUNCTION DATA
Charles A. Freihofer, 207 Winding Way,
Merion Station, Pa.
Filed June 7, 1954, Ser. No. 434,920
2 Claims. (Cl. 235—184)

This invention relates to a system for measuring time function data and for totalizing such data.

While the invention is intended for use in any instance for any specific purpose to which it is applicable, it is particularly applicable to the measuring and totalizing of time function data in connection with a particular job or jobs in industrial plants. Thus, the invention is applicable to the totalizing of labor cost data in connection with a job being performed by one or more workers. For example, it may be utilized to totalize man-time units required by a particular job, or it may be utilized to totalize actual labor cost of the job.

In the past cost accounting in industrial plants has generally involved manual recording of the man-hours spent on each job and computation of the cost according to the pay rate of the worker or workers employed on the job. This procedure is time-consuming and is subject to error. There has long been a need for some simple and reliable method of determining job cost, and the present invention meets this need.

One object of the present invention is to provide a simple and reliable system for measuring time function data and for totalizing the same.

Another object of the invention is to provide a system which is applicable to cost data totalizing in connection with any job in an industrial plant.

A further object of the invention is to provide a system which may be extended to any extent desired to make it applicable to the simultaneous totalizing of cost data in connection with a plurality of jobs.

A further object of the invention is to provide a system which is flexible and may be used under various conditions.

Other objects and features of the invention will be apparent from the following description.

The system provided by this invention comprises essentially a circuit having connected thereto at least one load impedance of predetermined value related to the time function data to be measured, means for supplying electric energy or power at substantially constant voltage to said circuit, means for generating current pulses at a repetition rate depending upon the magnitude of the current in said circuit, and a totalizer or counter to which said pulses are supplied. For the sake of simplicity, the load impedance (or impedances) is resistive even where A.C. is employed, although it is contemplated that reactive impedance might be employed. For some purposes, it is desired to provide different discrete values of current at different times, and for this purpose it is preferred to employ a plurality of load impedances and associated switches. As a practical matter, parallel-connected load resistances are preferably employed, as the total load current then increases with increased number of the resistances in circuit. Series-connected resistances, and associated switches for shorting them out at will, would cause the load current to decrease with increased number of included resistances. However, it might be feasible at some time to employ series-connected resistances or to employ a single variable resistance with discrete adjustment points. In its broader aspect the invention contemplates such possibilities. Another way of changing the load current is to change the value of the applied voltage. The pulse generation according to the magnitude of the current is preferably effected by using a simple watt-hour meter modified for the purpose of this invention, and by using a photoelectric means in conjunction with the modified meter. However any other suitable pulse-generating arrangement may be employed.

Referring now to the accompanying drawings,

FIG. 3 is a diagrammatic illustration of a circuit arrangement which may be employed in the systems shown in FIGS. 1 and 2; and FIG. 4 is a diagrammatic illustration of another embodiment of the invention.

Figure 1:
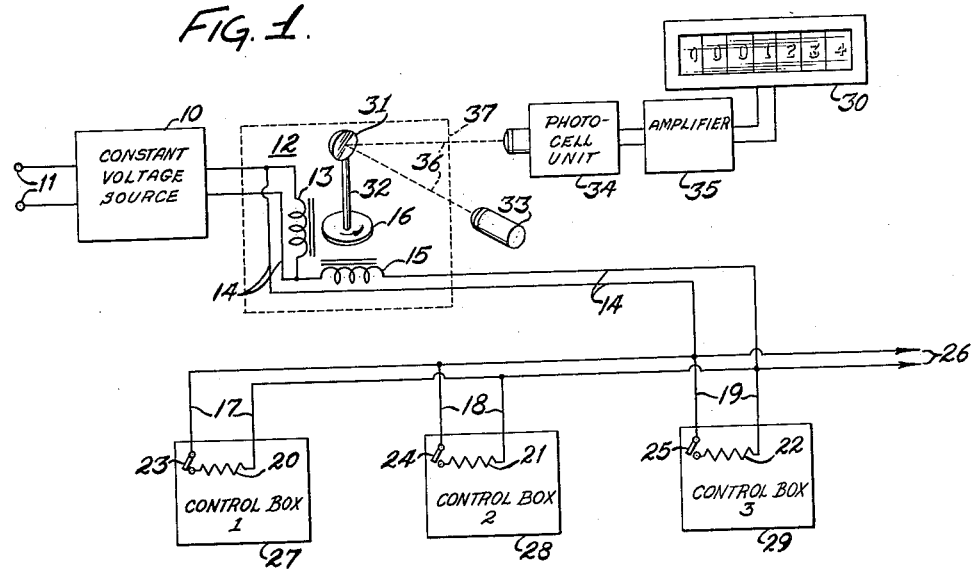
FIG. 1 is a diagrammatic illustration of a simple embodiment of the invention.

Referring first to FIG. 1, there is provided an electric power source 10 of substantially constant predetermined voltage, which may comprise a conventional regulated alternating current power supply having input terminals 11 adapted to be connected to a power outlet such as an outlet furnishing 115-volt 60-cycle power. Connected to the constant-voltage power source 10 is a device 12 which is cyclically operable at a rate proportional to the magnitude of electric current flowing therethrough. Conveniently, the device 12 is a conventional watt-hour meter modified in a simple manner for the purpose of the present invention. As is well known, such a meter comprises a voltage coil 13 connected across the circuit conductors 14, a current coil 15 serially connected in one of the circuit conductors, and a rotatable disk 16 which is driven by the electrical energy supplied to the device. In customary use of a watt-hour meter, the meter measures energy consumption in watt-hours, as well understood, and the rate of rotation of the disk 16 at any particular instant is a function of the power being consumed by the connected load. In the present instance, the voltage across the circuit conductors 14 is maintained constant and, therefore, the rate of rotation of the disk 16 is proportional to the magnitude of current flowing through the device 12 to the connected load.

In further accordance with the present invention, one or more load resistances of predetermined value or values may be connected to the circuit 14 to determine the magnitude of the current flow therein. It will be understood, of course, that the magnitude of current flowing in the circuit 14 at any particular instant will be determined by the total resistance load connected to the circuit, in accordance with Ohm's law. Therefore, the rate of rotation of disk 16 at any particular time will be a function of the total resistance load connected to the circuit 14.

In the specific illustration of FIG. 1 there are three circuit branches 17, 18 and 19 connected to the circuit 14 in parallel relation with one another, and three load resistances 20, 21 and 22 are included respectively in the three branches. Manual switches 23, 24 and 25 are also included respectively in the three branches in series with the respective load resistances to enable manual closure of one or more of the branch circuits. It is to be understood that additional circuit branches and load resistances may be included in the system, and this is indicated by the arrowhead lines 26. Preferably, the load resistances are arranged in individual control boxes as represented at 27, 28 and 29 which may be numbered for identification. In application of the system to determination of cost data for a particular job, each worker on the job will be represented by one of the control boxes, and at the start of the job the manual switches on a number of the control boxes corresponding to the number of workers will be closed, and these switches will be opened at the finish of the job. Of course, a master switch may be included in the circuit to be opened immediately at the finish of a job.

In further accordance with the present invention a totalizing device 30 is provided, and provision is made for actuating such device according to the rate of rotation of the disk 16. Preferably, the device 30 is a counter which is operable by successive current pulses, and this device may be of conventional form comprising a simple counter mechanism operable by a solenoid-ratchet mechanism and adapted to be reset to zero at the end of a counting operation. It will be understood, therefore, that the device 30 serves to count the number of pulses supplied to it over a period of time. The purpose here is to supply the current pulses to the device 30 at a rate corresponding to the rate of rotation of the disk 16.

While any suitable arrangement may be employed for this purpose, the arrangement illustrated is preferred, as it is simple and dependable and employs conventional devices. This arrangement comprises a simple light reflector 31 mounted on the disk 16 as by means of a supporting rod 32 extending from the center or axis of the disk, a light beam source 33, a photo-cell unit 34 and an amplifier 35. The light beam source 33 is a simple light beam projector arranged to project a beam of light, represented at 36, in a predetermined path toward the reflector 31. The photo-cell unit 34 is arranged to receive the reflected light beam when the reflector 31 is in such position that it reflects the light beam along a predetermined path. It will be apparent that this will occur once during each revolution of the disk 16 and, therefore, the photo-cell unit 34 will be activated once during each rotative cycle of the disk. An enclosure 37 may serve to confine the reflected light and may have apertures or windows to admit the projected light beam 36 and to permit egress of the reflected light beam only along the predetermined path extending to the photo-cell unit. The amplifier 35 may be a conventional vacuum tube amplifier which receives pulses from the photo-cell unit 34 and amplifies such pulses and supplies them to the device 30. The devices 12, 33, 34 and 35 may all be in a common housing if desired.

It will be apparent from the foregoing that the rate at which pulses are supplied to the device 30 is a function of the total resistance load connected to the circuit 14 and is, therefore, dependent upon the resistances connected to the circuit 14. For various purposes to which the invention may be applied the individual load resistances may be either equal or unequal.

As applied to determination of data in connection with performance of a job, the system may be used for example to determine man-hours in connection with the job. In this instance, the connected load resistances, each of which represents a worker on the job, will have the same resistance. By way of example, the value of each load resistance may be chosen so that a single connected load resistance will cause rotation of disk 16 at a rate of sixty revolutions per hour, so that a reading of "60" on the totalizer or counter 30 will represent one man hour. It will be apparent that the reading at the end of an hour will be a multiple of sixty according to the number of workers involved. At the finish of the job, the total man-hours consumed may be determined simply by dividing the reading by sixty.

Where it is desired to determine monetary cost of a job, the load resistances will be equal or unequal according to the pay rates of the workers involved. By way of specific example, the current coil of the device 12 may be caused to effect rotation of disk 16 at a rate of 100 revolutions per hour with 5000 ohms resistance connected to circuit 14, and with a regulated voltage of 115 volts. In this instance, 100 revolutions of the disk 16 may represent a cost of $1.00. The hourly rates of the workers will then be referenced from this base, the values of the load resistances representing the various workers being chosen accordingly.

Where it is desired to determine both man-hours and monetary cost in connection with a single job, a dual system may be provided comprising two systems of the character shown in FIG. 1, one to determine man-hours and the other to determine monetary cost of the job, the two systems operating simultaneously. The system shown in FIG. 2 could be thus used although it has other uses as described below.

In a system of the character described, it will be apparent that any appreciable resistance of the circuit conductors will introduce error. However, by employing conductors of appropriate size, the error factor can be so minimized as to be negligible.

Figure 2:
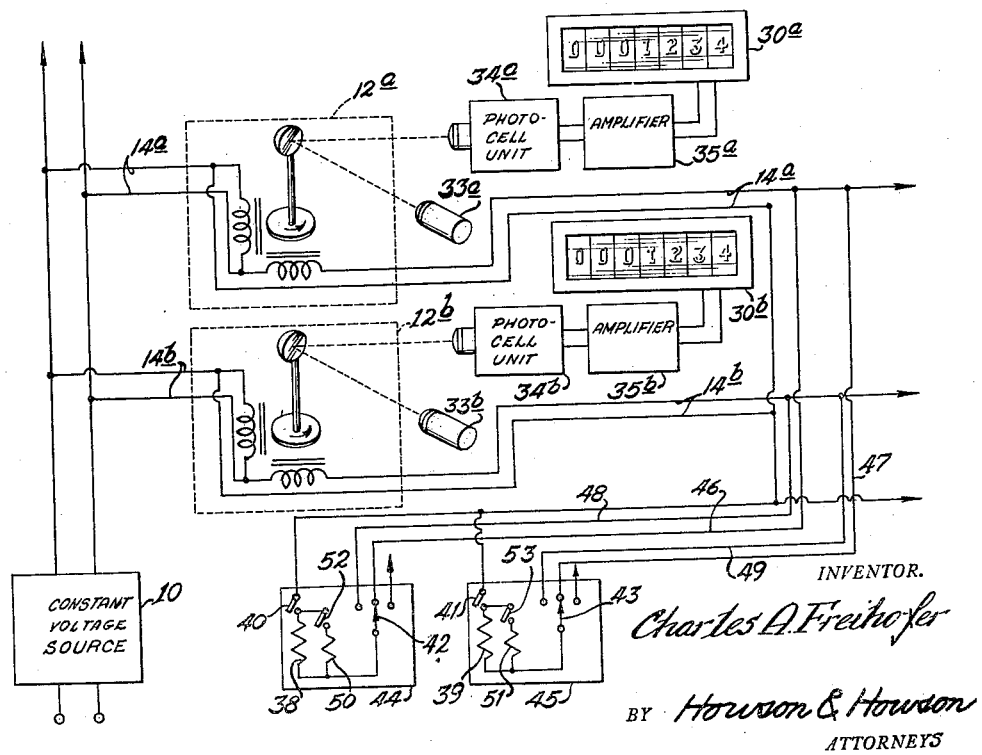
FIG. 2 is a similar illustration of a further embodiment showing the capabilities of the system.

FIG. 2 shows a further embodiment of the invention which illustrates the flexibility and adaptability of the system. In this instance there are a plurality of circuits connected to the constant voltage source 10, two such circuits being shown at 14a and 14b. The devices 12a and 12b are similar to the device 12 of FIG. 1. The associated devices also correspond to those in FIG. 1 and are similarly designated.

In this instance load resistances 38 and 39, and associated manual switches 40 and 41 are included in parallel circuit branches connected to circuits 14a and 14b. Manual selector switches 42 and 43 are provided on the control boxes 44 and 45, by means of which either of the load resistances 38 and 39 can be connected to either of the circuits 14a and 14b. Thus, with the switches 42 and 43 in the position shown, the load resistances 38 and 39 are both connected to circuit 14a over conductors 46 and 47. By moving switch 42 to its left-hand position, load resistance 38 may be connected to circuit 14b over conductor 48; and similarly by moving switch 43 to its left-hand position the load resistance 39 may be connected to circuit 14b over conductor 49. It will be apparent that any number of control boxes including load resistances may be included in this system. Furthermore, any number of main circuits and associated devices may be employed. These extensions of the system are indicated by the arrowhead lines. It should be noted that the number of contacts in each of the selector switches 42 and 43 is dependent upon the number of main circuits employed.

In a system of this character each counter may be assigned to a job, and the data pertaining to jobs being performed simultaneously may be totalized. Thus, the number of totalizing arrangements provided in particular instance may correspond to the number of jobs that may be performed simultaneously, and the number of control boxes provided may correspond to the total number of workers that may be employed on these jobs.

FIG. 2 illustrates a further feature which may be incorporated in the system. When a job runs overtime the pay rate of each worker is increased for overtime work, for example it may be one and one-half times the normal rate. To enable use of the system during overtime periods, auxiliary resistances 50 and 51 are provided in the control boxes and are connected in shunt relation with the main resistances, and manual switches 52 and 53 are provided to enable insertion of the auxiliary resistances at the start of any overtime period. The auxiliary resistances should be of a value to cause increase of the current according to the overtime pay rate. To explain this more fully, where the pay rate increases by 50% during overtime periods, each man working overtime may be regarded as one and one-half men and, therefore, the current drawn by each load unit or control box should be increased by 50% during the overtime period. Hence, the load resistance of each load unit or control box must be reduced by the insertion of the auxiliary resistance to an extent to bring about the 50% increase of current drawn by that unit. While switches 52 and 53 are shown as manual switches, they could be operated by a timer to insert the auxiliary resistances automatically at the start of an overtime period.

An alternative way of effecting operation of the system according to overtime pay rate would be to raise the applied voltage. However, this method is less desirable than the above-described method employing auxiliary resistances.

FIG. 3 shows a specific circuit arrangement which may be employed in the embodiments above described for generation of current pulses. In this arrangement, the solenoid 54 of the totalizer or counter is connected in the plate circuit of an amplifier tube 55 which is controlled by a phototube 56. In the absence of light impingement on the phototube 56, the negative voltage across capacitor 57 serves to bias the control grid of tube 55 so as to maintain the tube substantially cut off or at such low conduction as to maintain the solenoid 54 effectively deenergized. Activation of the phototube 56 causes current flow to produce a voltage across resistor 58 which overcomes the bias on the control grid of tube 55 and causes conduction thereof to energize the solenoid 54. Because of the momentary light impingement on the phototube 56, the current flow through the solenoid 54 is in the form of a pulse. It will be understood, of course, that the circuit arrangement shown in FIG. 3 is merely exemplary as any other suitable arrangement may be employed.

In the above description of the systems shown in FIGS. 1 and 2, an A.C. source was assumed. However, a D.C. source may be employed, in which case the watt-hour meter will be a D.C. meter.

FIG. 4 shows another embodiment of the invention wherein change of load current is effected by changing the applied voltage. While either A.C. or D.C. may be employed, it is assumed that 59 is a conventional regulated D.C. power supply which provides a substantially constant voltage. By means of potentiometer 60 different voltages may be applied to circuit 61 in which there is a load resistance 62 of predetermined value. Of course, if A.C. were employed a transformer with voltage taps could be used instead of the potentiometer. In the illustration potentiometer 60 has three discrete voltage points 63, 64 and 65. It will be apparent that this arrangement provides an alternative way of providing discrete current values in the circuit 61. As in the previously described embodiments, device 66 effects rotation of reflector 67 which periodically reflects the light beam from projector 68 onto photocell unit 69, and the generated pulses are amplified by amplifier 70 and supplied to counter 71.

While certain embodiments of the invention have been illustrated and described, the invention is not limited thereto but contemplates such further embodiments and modifications as may occur to persons skilled in the art. Moreover, a system of the character provided by this invention may be used for any purpose to which it is applicable and is not limited to the uses herein described.

I claim:
1. The method of determining man-hours worked by integrating time function data comprising selectively connecting in parallel with one another to a source of constant voltage, a fixed or unitary impedance for each man who is working and removing the impedance as each man finishes working and continuously integrating over a selected period of time the total current drawn.

2. The method of determining the total wage cost of selected labor by integrating time function data comprising selectively connecting in parallel with one another to a source of constant voltage, impedances individually representative of the wage rate of a particular worker while that worker is working and removing his representative wage rate impedance as each man finishes working and continuously integrating over a selected period of time the total current drawn.

References Cited in the file of this patent

UNITED STATES PATENTS

| | | |
|---|---|---|
| 1,986,986 | Swartwout | Jan. 8, 1935 |
| 2,080,186 | Reymond | May 11, 1937 |
| 2,092,119 | Hopkins | Sept. 7, 1937 |
| 2,092,120 | Hopkins | Sept. 7, 1937 |
| 2,112,683 | Woolley | Mar. 29, 1938 |
| 2,266,862 | Hardey | Dec. 23, 1941 |
| 2,406,836 | Holden | Sept. 3, 1946 |
| 2,566,868 | Allia | Sept. 4, 1951 |

FOREIGN PATENTS

| | | |
|---|---|---|
| 567,195 | Great Britain | Feb. 1, 1945 |